United States Patent
Franks

(10) Patent No.: US 6,245,124 B1
(45) Date of Patent: Jun. 12, 2001

(54) VERTICAL SHAFT FURNACES

(75) Inventor: Robert Franks, West Midlands (GB)

(73) Assignee: The BOC Group plc, Windlesham (GB)

(*) Notice: Subject to any disclaimer, the term of this patent is extended or adjusted under 35 U.S.C. 154(b) by 0 days.

(21) Appl. No.: 09/451,817

(22) Filed: Nov. 30, 1999

(51) Int. Cl.⁷ ............... C22B 7/00; C22B 15/00; C22B 4/08
(52) U.S. Cl. ............... 75/414; 75/653; 266/44; 266/197; 266/265; 266/901
(58) Field of Search ............... 75/653, 414; 266/44, 266/218, 197, 901, 265

(56) References Cited

U.S. PATENT DOCUMENTS

| | | |
|---|---|---|
| 3,199,977 | 8/1965 | Phillips et al. . |
| 5,149,363 | * 9/1992 | Contrucci et al. ............... 75/414 |
| 5,518,524 | 5/1996 | Wilson et al. . |
| 5,611,289 | 3/1997 | Brookes . |

FOREIGN PATENT DOCUMENTS

| | | |
|---|---|---|
| 3009934 A1 | * 9/1981 | (DE) . |
| 4115269 | 11/1991 | (DE) . |
| 2 248 325 | 5/1975 | (FR) . |

OTHER PUBLICATIONS

Derwent Abstract of CA–1333973, Issued Jun. 15, 1988 XP–002146523.*

Claus Meyer–Wulf, "Verminderung der Emissionen Traditioneller Kupfer–Schachtöfen durch Sauerstoffeindüsung und andere Massnahmen im Bereich der Gicht" Erzmetall 47(1994) Nov. pp 658–662.*

* cited by examiner

Primary Examiner—Roy King
Assistant Examiner—Tima McGuthry-Banks
(74) Attorney, Agent, or Firm—Joshua L. Cohen; Salvatore P. Pace

(57) ABSTRACT

A vertical shaft furnace for melting scrap metal, particularly copper scrap, uses one or more burners operated superstoichiometrically in order to provide excess oxygen to react with a waste gas stream passing up through the copper scrap thereby reducing the amount of carbon dioxide and visual contaminants in the waste gas stream.

8 Claims, 1 Drawing Sheet

VERTICAL SHAFT FURNACES

BACKGROUND OF THE INVENTION

This invention relates to the operation of vertical shaft furnaces so as to melt metal, particularly to copper shaft furnaces.

Copper shaft furnaces are used in foundries to melt scrap copper for re-use. Such furnaces are usually in the form of an upright cylinder having towards its lower end a water cooled grating. In use, copper scrap is charged into the furnace to rest on the grating. Below the grating fuel is burned, usually with air, in a substoichiometric quantity in order to produce a hot gas mixture which is not oxidizing towards copper (as any of the copper scrap which becomes oxidized during the melting process is effectively lost). The hot gas mixture passes upwardly through the grating and heats the copper scrap by convection sufficiently to melt the copper. Molten copper percolates downwardly through the scrap charge, and passes through the grating to be collected at the bottom of the furnace. From time to time molten metal is tapped off from the bottom of the furnace into a ladle for use in the foundry. Alternatively, the molten metal may be continuously tapped and collected in a suitable receiver.

A common disadvantage of such furnaces is that the waste gas which issues from the surface of the charge is environmentally harmful. This is particularly the case where the copper scrap is contaminated, with organic waxes or lubricants (such as where the contaminated scrap comprises swarf from a machining operation) for example. Smoke and particulates are usually entrained in the waste gas, which may also contain carbon monoxide, unburnt fuel and hydrogen. It is common to treat the waste gas to render it more environmentally acceptable, however although it is relatively straightforward to remove particulates from the waste gas by filtration, treatment of the waste gas to remove or render harmless the carbon monoxide is difficult and expensive, particularly in the presence of unburnt fuel and/or hydrogen which present a risk of explosion.

SUMMARY OF THE INVENTION

Accordingly, the present invention provides a method of operating a copper shaft furnace comprising charging the furnace with contaminated copper scrap to a level at least one furnace diameter below the furnace upper rim, burning at least one stream of fuel with a substoichiometric quantity of air or oxygen-enriched air and thereby forming a hot gas mixture which is substantially non-oxidizing to copper, passing the hot gas mixture upwardly through the scrap charge in the furnace and thereby melting the copper and entraining contaminants in waste gas which pass upwardly from the scrap charge, and introducing a hot oxidizing atmosphere into the shaft furnace at least one furnace diameter above the upper level of the scrap charge to react with substantially all of the waste gas.

The hot oxidizing atmosphere reacts with the waste gas, causing combustion of any unburnt fuel or hydrogen and converts carbon monoxide (CO) to less objectionable carbon dioxide. Surprisingly, it has been found that when treated in this way, typical waste gases contain no visible smoke or fumes, showing that the method of the invention also combusts the entrained organic particulate matter.

Just as it is important that the hot gas mixture is effectively non-oxidizing in order to prevent the oxidation, and thus, loss of copper, so it is important that the hot oxidizing atmosphere is prevented from coming into contact with the top surface of the scrap charge. This is achieved by ensuring that the hot oxidizing atmosphere is introduced into the furnace sufficiently above the scrap charge that all of the oxidant is directed away from the scrap charge by the upward flow of waste gas therefrom. It is also important that the oxidizing atmosphere be hot enough for combustion with the waste gas to be self-sustaining.

To allow the reaction between the waste gas and the hot oxidizing atmosphere to finish before the waste gas leaves the top of the furnace and enters the waste gas treatment system, the hot oxidizing atmosphere is preferably introduced into the shaft furnace at least one furnace diameter below the upper rim of the shaft. While this might be thought disadvantageous in that it prevents charging the furnace to its maximum upper limit, this is surprisingly not the case. It has been found that lowering the level of the top surface of the charge leads to an increase in temperature in the charge, possibly due to the additional heat supplied to the top of the charge by the combustion reaction of the waste gas with the hot oxidizing atmosphere. This temperature increase leads to more rapid melting and hence shorter periods between successive scrap chargings. Accordingly, the present invention can maintain or even improve furnace throughput.

The hot oxidizing atmosphere may be introduced so as to produce at least one substantially axi-symmetric (relative to the vertical axis of the furnace) layer of hot oxidizing atmosphere within the furnace with the layer or each layer being at least one furnace diameter above the upper level of the scrap charge.

As stated above, the layer or each layer is provided at least one furnace diameter below the furnace upper rim. The term "rim" also encompasses the lower edge of a scrap charge door, if one is used in the furnace in question. The hot oxidizing atmosphere is conveniently produced by two or more oxygen/fuel burners operated superstoichiometrically. Alternatively, the hot oxidizing atmosphere may be provided by air/fuel burners which are operated with an oxygen lance to give under-flame oxygen enrichment, as is known in the art. This is, however, a less preferable method as typically it would tend to increase the $NO_x$ level in the waste gas. Burners are preferably angled downwardly, towards the scrap charge, at about 15° to the vertical. Enrichment can be used to draw the flame down towards the scrap charge.

If oxy/fuel burners are used, these are preferably operated superstoichiometrically with at least a 15% excess of oxygen over that required for complete combustion of the fluid, and more preferably with a 50 to 70% excess. However, in practice this will be determined by the levels of smoke and CO being emitted. Suitable burners are described in U.S. Pat. No. 5,882,184 and, in the event unacceptably high $NO_x$ levels are present, U.S. Pat. No. 5,994,507, which are hereby incorporated by reference. Further excess oxygen can be introduced using the air port of an air/oxy/fuel burner in order to raise the oxygen level in the furnace, where appropriate.

DETAILED DESCRIPTION OF THE INVENTION

Figure 1:
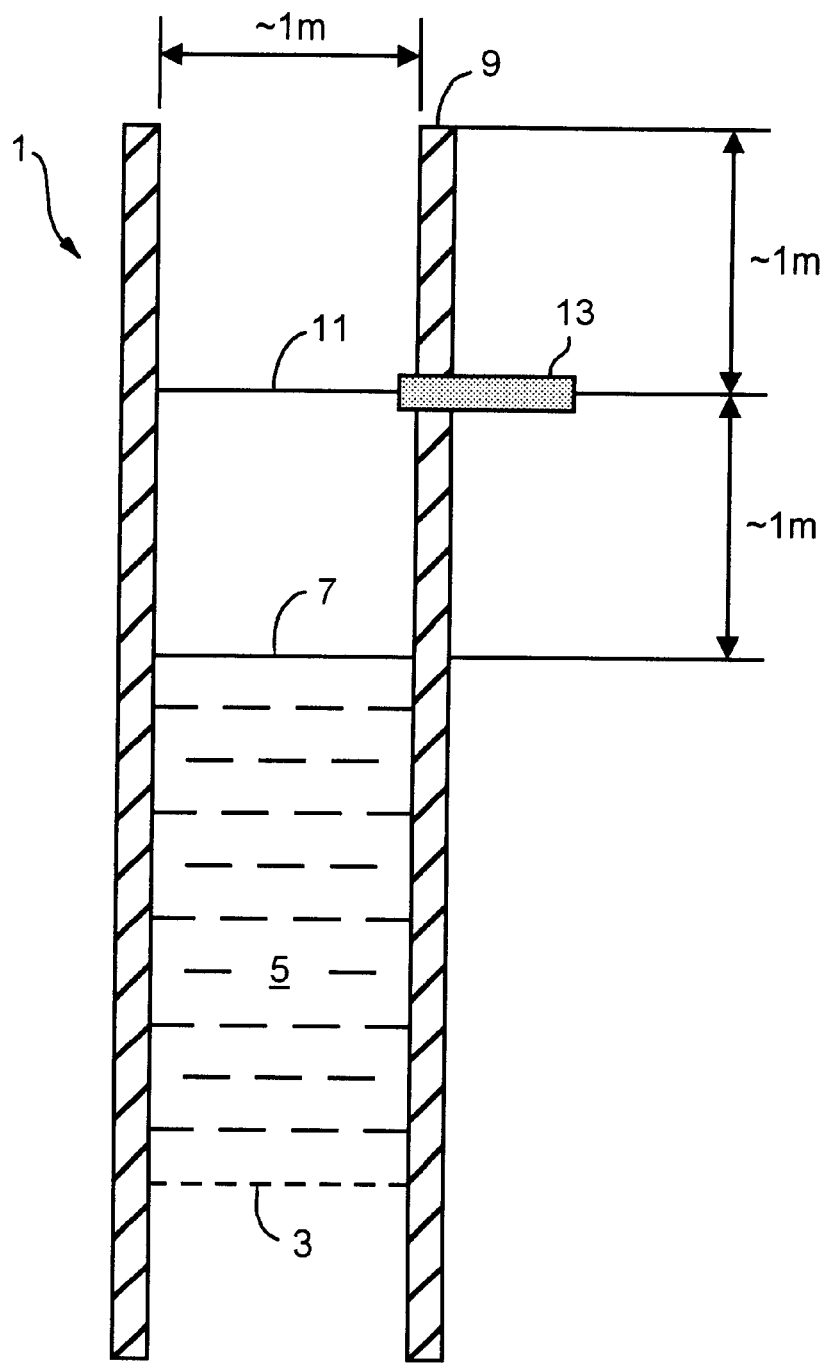
FIG. 1 is a cross-sectional representation of a vertical shaft furnace according to the present invention.

The invention, which also extends to a furnace adapted to perform the inventive method, will now be described by way of example and with reference to the accompanying schematic drawing of a vertical shaft furnace for melting copper adapted to the method of operation of the invention.

The copper shaft furnace 1 illustrated is approximately 1 m in diameter. Contaminated copper scrap metal is charged into the furnace and sits on a water-cooled grating 3. The scrap metal charge 5 has an upper surface 7 which is approximately 2 m below the upper rim 9 of the furnace. As is conventional practice, the scrap metal charge 5 is melted by means of the hot gas mixture produced by burners (not shown) beneath the grating 3. As the hot gas mixture rises through the scrap metal charge 5, heat is transferred to the copper by convection, the copper melts and percolates through the grating 3 to be collected therebelow. The hot gas mixture entrains various contaminants as it rises through the scrap charge 5, to become waste gas as it emerges from the surface 7 of the scrap charge 5. This waste gas rises to a level 11 where it encounters a hot oxidizing atmosphere, which is produced by oxy/fuel burners 13 of the type described in U.S. Pat. No. 5,882,184 firing superstoichiometrically. In practice, three such burners 13 were used (only one is shown). These were circumferentially disposed at equal angles around the furnace (so as to produce a widespread "sheet" of hot oxidizing atmosphere, to react with substantially all of the waste gas), in substantially the same horizontal plane, about 1 m below the upper rim 9 of the furnace (to allow the combustion reaction to be substantially completed before the waste gas leaves the furnace 1 to enter the waste gas treatment ductwork (not shown)).

In operation but without the burners 13 in use, the waste gas issuing from the top of the furnace was analyzed and found to contain between 1500 and 2000 mg CO per m$^3$ waste gas. With a similar copper scrap charge but with burners 13 in use, the CO level was found to drop to an average of 400 mg/m$^3$. This significant reduction in CO levels was accompanied by complete elimination of any visible smoke in the waste gas issuing from the furnace.

Those skilled in the art will appreciate that the combustion reaction of the hot oxidizing atmosphere with the waste gases could be rendered yet more effective in several ways. For example, more than three burners could be used and/or the flow rates of oxygen therethrough could be increased, and/or a second 'layer' of burners could be provided to increase the time that the waste gas is in contact with, and thus can react with, the hot oxidizing atmosphere. After oxidation the waste gas can be analyzed, and the hot oxidizing atmosphere adjusted accordingly, so as to ensure complete reaction and cleaning of the waste gas. This analysis and adjustment can be carried out automatically, with the appropriate sensors and control apparatus for the burners, as is known in the art.

The invention although described in relation to shaft furnaces for melting copper scrap metal may equally be applicable to shaft furnaces for melting other non-ferrous scrap metals, such as lead, zinc, aluminum or nickel, or to ferrous metal furnaces, such as cupolas.

It will be appreciated that the present invention has three significant benefits for vertical shaft furnace operation:

1) it provides an efficient method for reducing CO and smoke emissions;

2) the provision of burners above the charge improves preheating, particularly when combustible gases are present in the waste gas; and 3) it provides an efficient method for destroying CO within the shaft furnace before if has a chance of entering the waste gas filtration plant. it will be apparent to those skilled in the art that various modifications and variation can be made to the structure and methodology of the present invention without departing from the scope or spirit of the invention. In view of the foregoing, it is intended that the present invention covers modifications and variations provided they fall within the scope of the following claims and their equivalents.

I claim:

1. A method of operating a vertical shaft furnace having a upper rim comprising charging the furnace with scrap metal to a level at least one diameter below the upper rim of the furnace, burning at least one stream of fuel with a substoichiometric quantity of air or oxygen-enriched air and thereby forming a hot gas mixture which is substantially non-oxidizing to metal, passing the hot gas mixture upwardly through the scrap metal in the furnace and thereby melting the metal scrap and entraining contaminants in a stream of waste gas which passes upwardly from the scrap metal, and introducing a hot oxidizing atmosphere into the shaft furnace at least one furnace diameter above the upper level of the scrap metal to react with substantially all of the waste gas.

2. A method according to claim 1 wherein the hot oxidizing atmosphere is introduced so as to produce at least one substantially axi-symmetric layer of hot oxidizing atmosphere within the furnace and wherein said layer or layers are at least one furnace diameter above the upper level of the scrap metal.

3. A method according to claim 2 wherein each of said layer or layers is provided at least one furnace diameter below the upper rim of the furnace.

4. A method according to claim 1 wherein the hot oxidizing atmosphere is produced by two or more oxy/fuel burners operated superstoichiometrically.

5. A method according to claim 4 wherein the oxy/fuel burners are operated so as to provide at least a 15% stoichiometric excess of oxygen over that required for complete combustion of the fuel.

6. A vertical shaft furnace for melting scrap metal comprising a substantially cylindrical shaft having a diameter and a plurality of oxy/fuel burners located at least approximately one diameter above the scrap metal.

7. The vertical shaft furnace of claim 6 wherein at least one of said plurality of oxy/fuel burners is operated superstoichiometrically.

8. The vertical shaft furnace of claim 7 wherein the burners are operated so as to provide at least a 15% stoichiometric excess of oxygen over that required for complete combustion of the fuel.

* * * * *